(12) United States Patent
Kim et al.

(10) Patent No.: US 10,513,230 B2
(45) Date of Patent: Dec. 24, 2019

(54) SPEAKER FOR VEHICLE

(71) Applicants: HYUNDAI MOTOR COMPANY, Seoul (KR); KIA MOTORS CORPORATION, Seoul (KR)

(72) Inventors: Dong Kyu Kim, Bucheon-si (KR); Jaejun Lee, Anyang-si (KR); Jaya Prakash Batte, Andhra Pradesh (IN); Masthan Vikas Munaga, Andhra Pradesh (IN)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/978,380

(22) Filed: May 14, 2018

(65) Prior Publication Data

US 2019/0126844 A1 May 2, 2019

(30) Foreign Application Priority Data

Oct. 30, 2017 (IN) .............................. 201711038504

(51) Int. Cl.
*H04R 1/02* (2006.01)
*B60R 11/02* (2006.01)
*H04R 5/02* (2006.01)

(52) U.S. Cl.
CPC .......... *B60R 11/0217* (2013.01); *H04R 1/025* (2013.01); *H04R 5/02* (2013.01); *H04R 2499/13* (2013.01)

(58) Field of Classification Search
USPC ........................................................ 381/389
See application file for complete search history.

(56) References Cited

U.S. PATENT DOCUMENTS

| 6,070,931 | A | * | 6/2000 | Yamaguchi | ......... B60R 16/0215 |
| | | | | | 296/146.7 |
| 6,374,942 | B1 | * | 4/2002 | Huggins | ................ H04R 1/025 |
| | | | | | 181/150 |
| 7,177,438 | B2 | | 2/2007 | Iwaya et al. | |
| 8,103,041 | B2 | * | 1/2012 | Koch | .................. B60R 11/0217 |
| | | | | | 381/386 |
| 9,843,849 | B1 | * | 12/2017 | Lasnier de Lavalette | ................... |
| | | | | | H04R 1/025 |
| 2004/0037445 | A1 | * | 2/2004 | Kirihara | .............. B60R 11/0217 |
| | | | | | 381/389 |

(Continued)

FOREIGN PATENT DOCUMENTS

JP 2004-17835 A 1/2004
KR 10-2006-0062374 A 6/2006

(Continued)

*Primary Examiner* — Quoc D Tran
(74) *Attorney, Agent, or Firm* — Brinks Gilson & Lione

(57) ABSTRACT

A speaker for a vehicle includes: a base plate which is installed in a door of the vehicle and includes a first coupling portion; and a speaker module including a second coupling portion. In particular, the first coupling portion has a predetermined pattern formed along a circumferential direction of the inner surface of the first coupling portion, and the second coupling portion includes a predetermined pattern formed along a circumferential direction of the outer surface of the second coupling portion such that the second coupling portion is interlocked with the first coupling portion, and a connector.

17 Claims, 15 Drawing Sheets

(56) References Cited

U.S. PATENT DOCUMENTS

2004/0247150 A1* 12/2004 Iwaya ................. B60R 11/0217
381/389
2018/0063610 A1* 3/2018 Tanabe ................ B60R 11/0217

FOREIGN PATENT DOCUMENTS

KR       10-1570775 B1    11/2015
WO       2010/010624 A1    1/2010

* cited by examiner

SPEAKER FOR VEHICLE

CROSS-REFERENCE TO RELATED APPLICATION

This application claims priority to and the benefit of Indian Patent Application No. 201711038504, filed on Oct. 30, 2017, the entire contents of which are incorporated herein by reference.

FIELD

The present disclosure relate to a speaker for vehicle.

BACKGROUND

The statements in this section merely provide background information related to the present disclosure and may not constitute prior art.

Lately, many persons riding in vehicles are enjoying video/audio equipment, such as radio, a CD player, MP3, TV, video, etc., every day. The sound waves of video/audio equipment are output to the inside of a vehicle through a speaker installed in the vehicle's body such as a door.

The speaker reproduces sound according to electrical signals amplified by an amplifier, and can be classified into an electrodynamic type, an electromagnetic type, an electrostatic type, a magnetostrictive type, etc., according to the principle and method of converting electrical signals into sound waves. The electrodynamic type (or dynamic type) speaker having high performance is widely used as a speaker for a vehicle.

For example, the electrodynamic type speaker uses the principle of causing sound signal current to flow through a coil (a voice coil) in a magnetic field of a permanent magnet and applying a mechanical force generated according to the intensity of the current to the coil to thereby make vibrations.

The speaker for a vehicle is connected to the amplifier of audio system by a wire, and the wire is connected to the contact of the speaker through a connector. Meanwhile, when it rains or when a vehicle is washed, water may enter the insides of the doors of the vehicle through windows that move up and down. If the water entered the insides of the doors gets in the connector of the speaker, the speaker may malfunction or break down.

Doors have different designs according to vehicle models, and according to the designs of the doors, water may enter the insides of the doors through different paths. Accordingly, we have discovered that changing the locations of the connectors of speakers in consideration of paths of water entering the inside of the doors according to vehicle models may reduce or prevent water from entering into the connectors.

Also, there may be a case in which the connector interferes with the door trim of the vehicle, and in this case, it is also needed to change the location of the connector.

However, in order to change the location of the connector, the location of a mounting hole formed in the door panel should change, resulting in additional costs.

Also, if a guide pin provided to install the speaker in the door panel is positioned below the speaker, it is difficult to assemble the speaker with the door panel, which may lead to an increase of the rate of defectives.

SUMMARY

The present disclosure provides a speaker for a vehicle capable of changing the location of a connector without changing the location of a mounting hole provided in a door panel of the vehicle or the location of a guide pin of the speaker.

The present disclosure provides a speaker for a vehicle capable of inhibiting or preventing a connector from interfering with a door trim of the vehicle.

It is another aspect of the present disclosure to provide a speaker for a vehicle capable of reducing or preventing water, which is entered between a door trim and a door panel of the vehicle, from getting into a connector.

As another aspect of the present disclosure, the speaker can be used in common in the door panels of various vehicles.

Additional aspects of the disclosure will be set forth in part in the description which follows and, in part, will be obvious from the description, or may be learned by practice of the disclosure.

In one form of the present disclosure, a speaker for a vehicle may include: a base plate configured to be installed in a door of the vehicle, and including a first coupling portion with a predetermined pattern formed along a circumferential direction of the inner surface of the first coupling portion; and a speaker module including a second coupling portion with a predetermined pattern formed along a circumferential direction of the outer surface of the second coupling portion. In particular, the second coupling portion is configured to be interlocked with the first coupling portion, and a connector.

The connector may be fixed at a part of the upper portion of the second coupling portion.

The predetermined patterns formed in the first coupling portion and the second coupling portion may include a saw tooth pattern.

When the second coupling portion is interlocked with the first coupling portion, the second coupling portion may be inhibited or prevented from moving in the circumferential direction of the first coupling portion.

When the second coupling portion is interlocked with the first coupling portion and then lifted upward, the second coupling portion may be separated from the first coupling portion.

The first coupling portion and the second coupling portion may be interlocked with each other although the first coupling portion or the second coupling portion is rotated by an arbitrary angle in the circumferential directions.

The base plate may further include an opening configured to pass at least one portion of the speaker module therethrough and a first separation preventing rib protruding upward along the circumference of the opening, and having an upper surface that is inclined.

The speaker module may further include a second separation preventing rib having a lower surface that is inclined, and when the speaker module moves upward to a predetermined height from the base plate, the second separation preventing rib may contact the first separation preventing rib to prevent the speaker module from departing from the base plate.

The speaker module may further include a plurality of shaft holes arranged at predetermined intervals along the circumferential direction of the second coupling portion.

The base plate may further include a guide shaft configured to be inserted into or taken out of the corresponding shaft holes.

The base plate may further include a mounting portion configured to install the base plate in the door of the vehicle.

In another aspect of the present disclosure, a speaker for a vehicle may include: a speaker module configured to be installed in a door of the vehicle, and including a track formed in the shape of a ring on the outer surface of the speaker module; a connector coupled with the speaker module to be movable in a circumferential direction of the speaker module along the track, and connected to the speaker module through a wire; and a wire winding device fixed at a part of the speaker module, and configured to adjust a length of the wire based on a location of the connector.

When the connector becomes distant from the wire winding device, the wire may be taken out of the wire winding device, and when the connector becomes close to the wire winding device, the wire may enter the inside of the wire winding device.

The speaker module may further include a plurality of track protrusions protruding outward from the track and arranged at predetermined intervals along a circumferential direction of the track.

The connector may further include a connector protrusion that is caught by at least one track protrusion of the plurality of track protrusions and configured to fix the connector at a portion of the track.

Both lateral surfaces of each track protrusion of the plurality of track protrusions and the connector protrusion may be inclined so that the connector protrusion is released from the corresponding track protrusion when a predetermined force or more is applied to the connector.

The speaker module may include a mounting portion configured to install the speaker module in the door of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
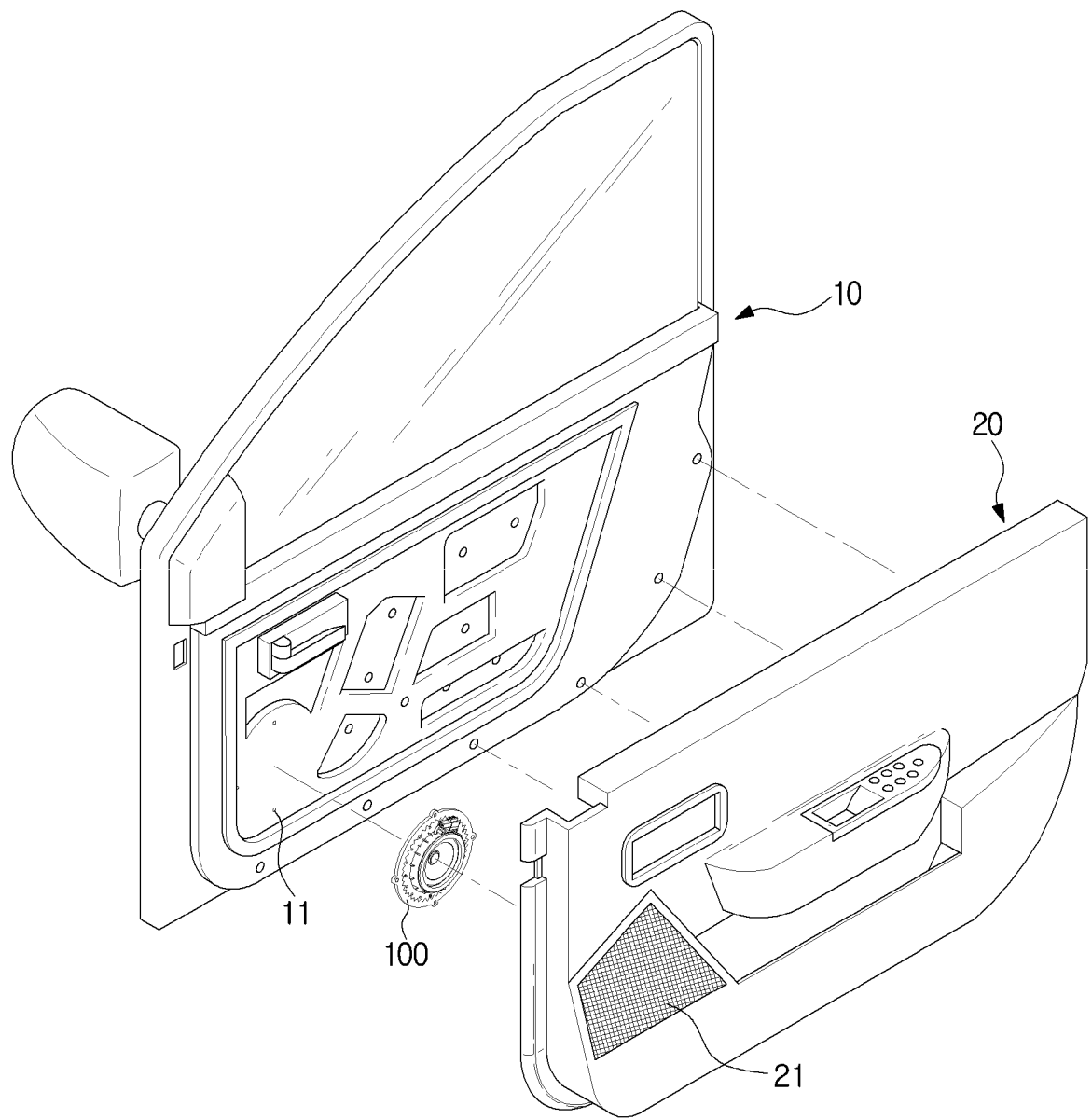
FIG. 1 is an exploded perspective view showing a door of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Configurations illustrated in the forms and the drawings described in the present specification are only the exemplary forms of the present disclosure, and thus it is to be understood that various modified examples, which may replace the forms and the drawings described in the present specification, are possible when filing the present application.

Also, like reference numerals or symbols denoted in the drawings of the present specification indicate elements or components that perform the substantially same functions.

Also, the terms used in the present specification are for describing forms and not for limiting or restricting the present disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Meanwhile, in the following description, the terms "front direction", "rear direction", "upper portion", "lower portion", etc. are defined based on the drawings, and do not intend to limit shapes and locations of individual components.

In the following description, a vehicle includes various kinds of mechanic equipment that can transport humans, goods, or animals from a departure point to a destination. For example, the vehicle may be an automobile to travel on roads or rails, a ship to travel by sea or river, or a plane to fly in the sky using the action of air.

Also, a vehicle traveling on roads or rails can move in a predetermined direction according to the rotations of at least one wheel. The vehicle may include a three- or four-wheeled vehicle, construction machinery, a two-wheeled vehicle, a prime mover bicycle, a bicycle, and a train travelling along rails.

A speaker for vehicle in one form of the present disclosure may be installed in a door panel or a door trim of a vehicle, and may be any speaker installed in a vehicle regardless of its installation location. Hereinafter, for convenience of description, a speaker that is installed in a door of a vehicle will be described as an example.

FIG. 1 is an exploded perspective view showing a door of a vehicle in one form of the present disclosure.

As shown in FIG. 1, a speaker 100 for a vehicle may be installed in a door panel 10 of a vehicle. In the door panel 10, a mounting hole 11 for installing the speaker 100 therein may be formed, and in the speaker 100, a mounting portion 115 (see FIG. 2) may be formed. Although not shown in FIG. 1, the mounting portion 115 of the speaker 100 may be coupled with the mounting hole 11 of the door panel 10 through a coupling member. After the speaker 100 is installed in the door panel 10, a door trim 20 may be coupled with the door panel 10. In the door trim 20, a speaker grill 21 may be disposed at a location corresponding to the speaker 100.

Meanwhile, in FIG. 1, the speaker 100 in forms shown in FIGS. 2 to 8 is shown as an example, however, a speaker 200 shown in FIGS. 9 to 15 may be installed in the door panel 10.

Figure 2:
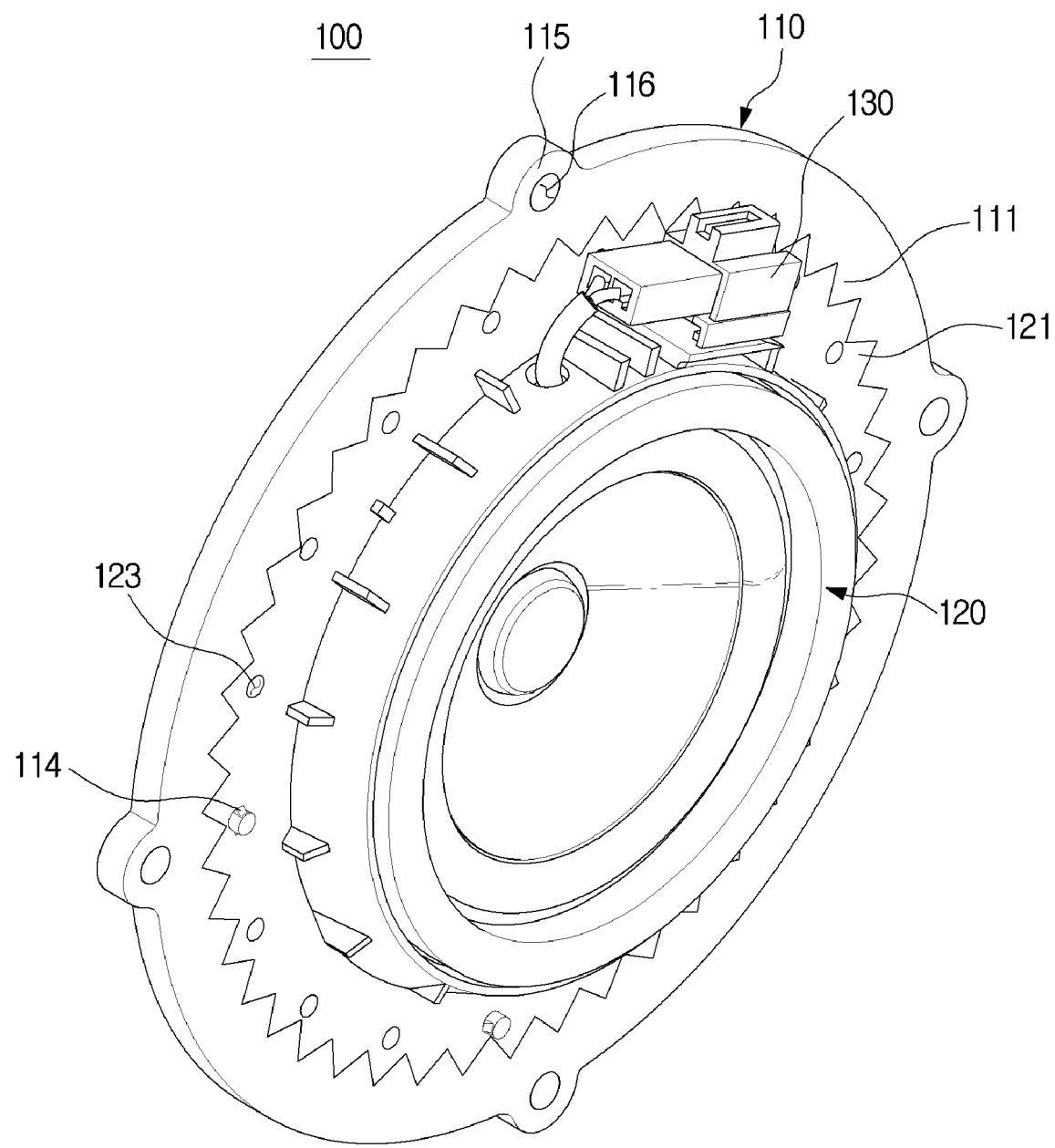
FIG. 2 shows a speaker for a vehicle.
Figure 3:
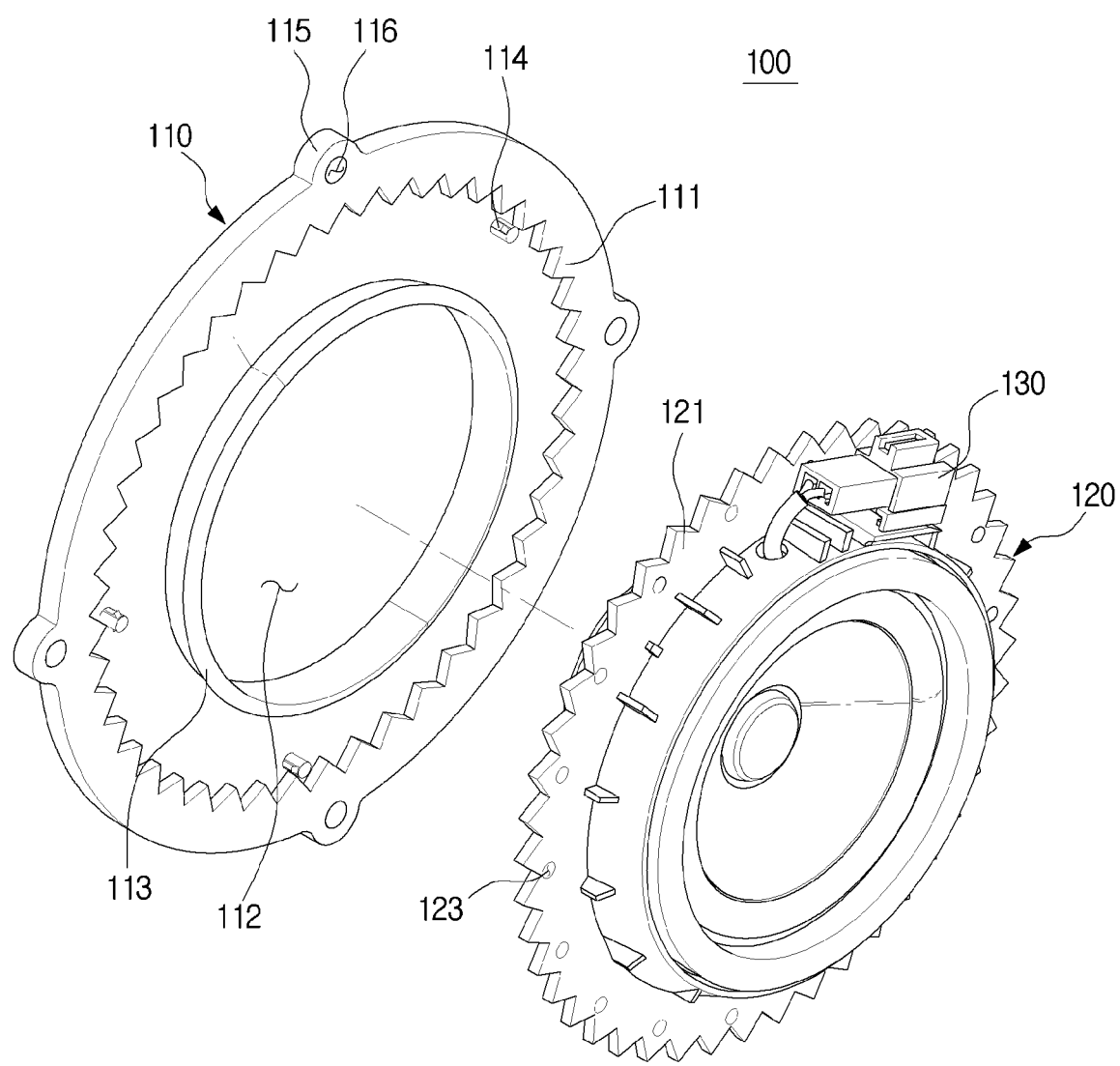
FIG. 3 is an exploded perspective view of the speaker for a vehicle shown in FIG. 2.

FIG. 2 shows a speaker for a vehicle in one form of the present disclosure, and FIG. 3 is an exploded perspective view of the speaker shown in FIG. 2.

The speaker 100 may include a base plate 110 installed in the door of the vehicle, and a speaker module 120 coupled with the base plate 110 and installed in the door of the vehicle.

The base plate 110 may include a first coupling portion 111.

In the first coupling portion 111, a predetermined pattern may be formed along the circumferential direction of the inner surface of the first coupling portion 111. In one form of the present disclosure, the predetermined pattern may be a saw tooth pattern. However, the predetermined pattern is not limited to the saw tooth pattern, and may be any repeating pattern formed along the circumferential direction of the inner surface. For example, the predetermined pattern may be a pattern in which a quadrangle, a semicircle, or a sine-wave shape appears repeatedly.

The speaker module 120 may include a second coupling portion 121.

In the second coupling portion 121, a predetermined pattern may be formed along the circumferential direction of the outer surface of the second coupling portion 121 so that the second coupling portion 121 can be interlocked with the first coupling portion 111. In one form of the present disclosure, since a saw tooth pattern is formed in the first coupling portion 111, the second coupling portion 121 may also include a saw tooth pattern. As described above, the predetermined pattern may include various shapes, and the pattern formed in the second coupling portion 121 may correspond to the pattern formed in the first coupling portion 111.

The first coupling portion 111 may be formed by making a dent in the base plate 110. Thereby, a groove may be formed in the inner surface of the first coupling portion 111, and the second coupling portion 121 may be inserted into and coupled with the groove. In other words, the inner surface of the first coupling portion 111 may be interlocked with the outer surface of the second coupling portion 121 so that the second coupling portion 121 can be coupled with the first coupling portion 111. Also, if the second coupling portion 121 is coupled with the first coupling portion 111, the speaker module 120 can be coupled with the base plate 110.

Meanwhile, the first coupling portion 111 having the repeating pattern formed along the circumferential direction of the inner surface is referred to as a female coupling portion, and the second coupling portion 121 having the repeating pattern formed along the circumferential direction of the outer surface is referred to as a male coupling portion.

Accordingly, in the current form, the first coupling portion 111 may be provided as a female coupling portion, and the second coupling portion 121 may be provided as a male coupling portion. However, the first coupling portion 111 may be provided as a male coupling portion, and the second coupling portion 121 may be provided as a female coupling portion.

The first coupling portion 111 and the second coupling portion 121 may have structural characteristics as follows.

If the first coupling portion 111 is interlocked with the second coupling portion 121, the second coupling portion 121 may be inhibited or prevented from moving in the circumferential direction of the first coupling portion 111. Likewise, the first coupling portion 111 may also be inhibited or prevented from moving in the circumferential direction of the second coupling portion 121.

The first coupling portion 111 and the second coupling portion 121 can be interlocked with each other although any one(s) of them is rotated by an arbitrary angle in the circumferential direction. For example, although the second coupling portion 121 is rotated by an arbitrary angle in the circumferential direction when the first coupling portion 111 is fixed, the second coupling portion 121 may be coupled with the first coupling portion 111. The reason is because the same repeating pattern is formed along the circumferential direction of the first coupling portion 111 and the second coupling portion 121. The arbitrary angle may be not the concept of succession. That is, the second coupling portion 121 may rotate with respect to the first coupling portion 111 in unit of the period of the repeating pattern to thus be coupled with the first coupling portion 111. According to the current form, an angle obtained by dividing 360 degrees by the number of saw-tooth segments formed in the first coupling portion 111 or the second coupling portion 121 may be a rotation angle unit. The arbitrary angle may be any one of multiples of the rotation angle unit.

The second coupling portion 121 may be removably coupled with the first coupling portion 111. By lifting the second coupling portion 121 interlocked with the first coupling portion 111 upward, the second coupling portion 121 can be separated from the first coupling portion 111.

That is, when the second coupling portion 121 is interlocked with the first coupling portion 111, a binding force in the circumferential direction may be generated, but no binding force in the axial direction or in the up-down direction may be generated. A binding force in the axial directions or in the up-down direction may be generated by a guide shaft 114 and first and second separation preventing ribs 113 and 122, which will be described later.

Meanwhile, through the above-described structures of the first coupling portion 111 and the second coupling portion 121, a connector 130 can change its location without changing the location of the mounting hole 11 formed in the door panel 10.

Typically, in order to change the location of a connector, it is desired to change the location of the mounting hole 11 of the door panel 10, or to change the location of the mounting portion 115 of the base plate 110. However, in the forms of the present disclosure, since the first coupling portion 111 and the second coupling portion 121 are provided, the speaker module 120 can be rotated at an arbitrary angle with respect to the base plate 110, without having to change the location of the base plate 110 installed in the door panel 10. Accordingly, the connector 130 disposed in the speaker module 120 may also be rotated at an arbitrary angle with respect to the base plate 110 and coupled with the base plate 110. Accordingly, when the connector 130 interferes with the door trim 20 or water gets into the connector 130, the problem can be overcome by changing the location of the connector 130 without having to change the structure of the speaker 100.

Figure 4:
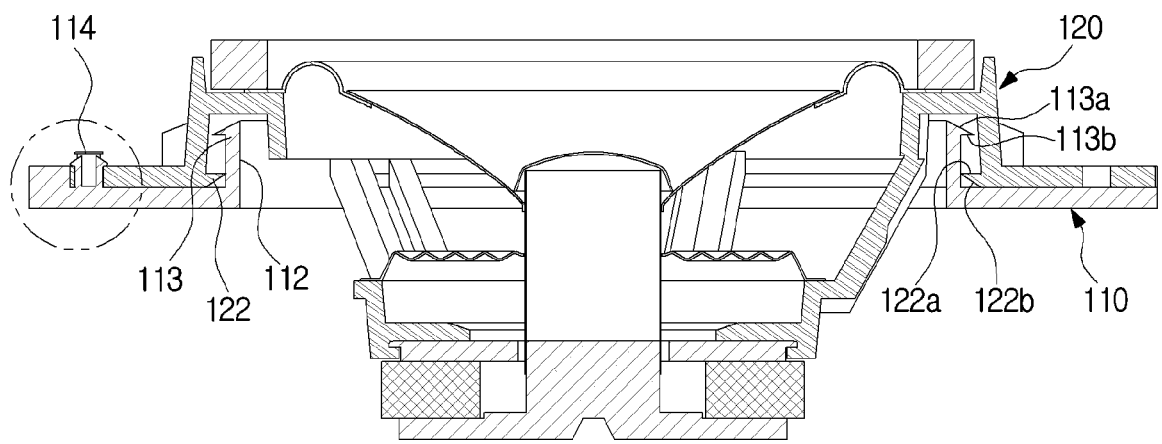
FIG. 4 is a cross-sectional view of the speaker for vehicle shown in FIG. 2.
Figure 5:
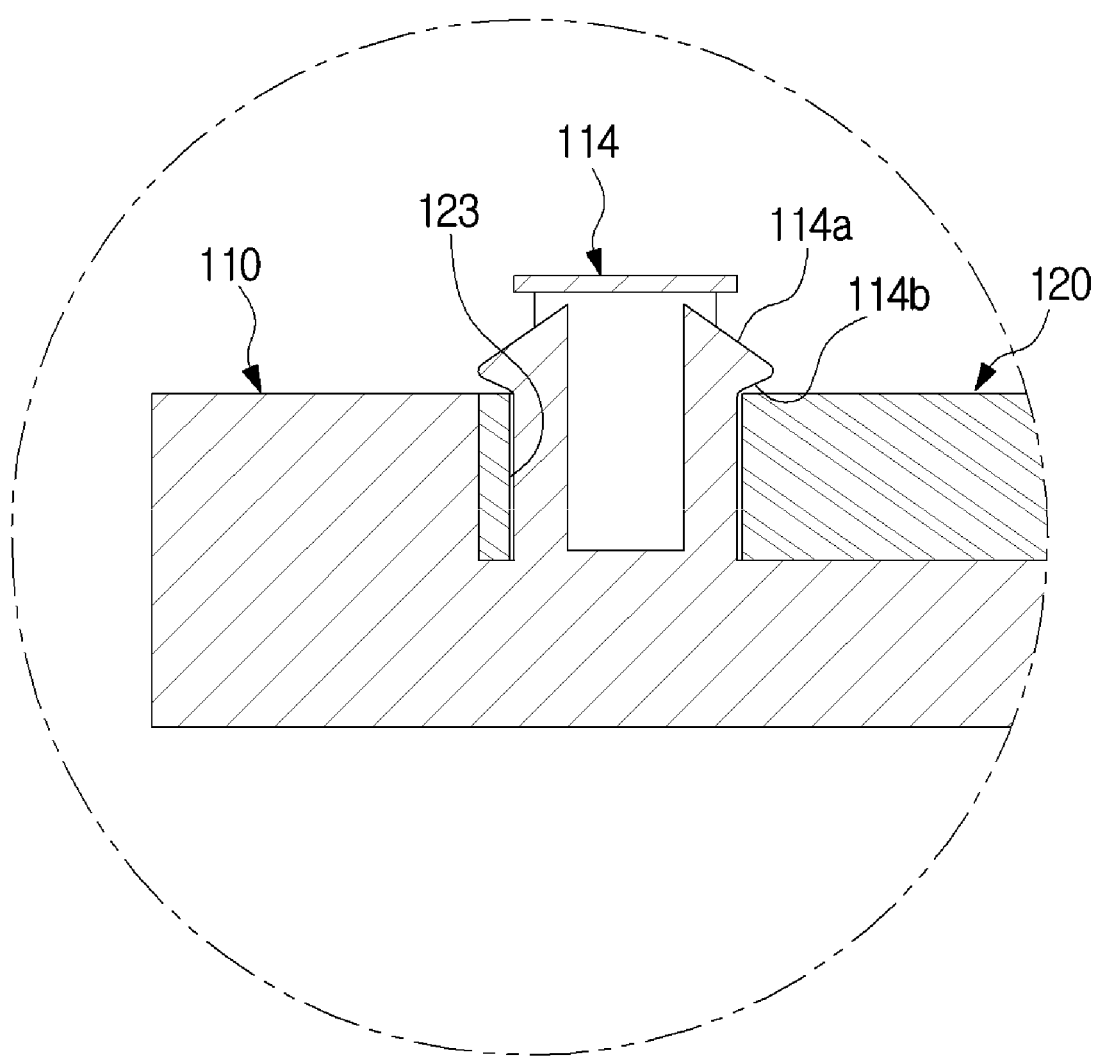
FIG. 5 is an enlarged view showing a part of the speaker for vehicle shown in FIG. 4.
Figure 6:
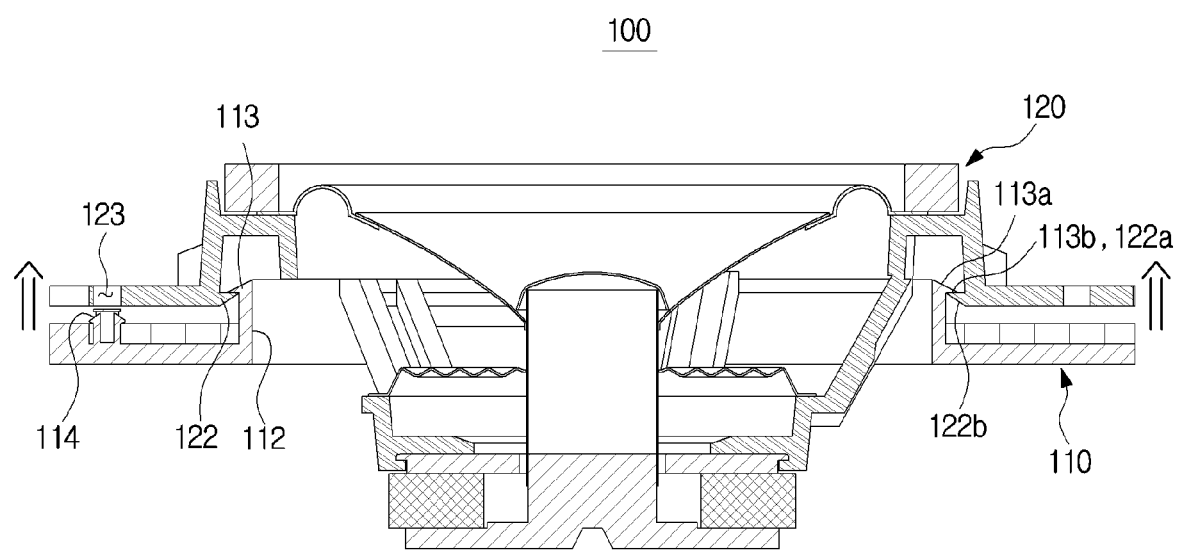
FIG. 6 is a cross-sectional view of the speaker for a vehicle shown in FIG. 4 when a speaker module is lifted upward.

FIG. 4 is a cross-sectional view of the speaker for vehicle shown in FIG. 2. FIG. 5 is an enlarged view showing a part of the speaker for vehicle shown in FIG. 4. FIG. 6 is a cross-sectional view of the speaker for vehicle shown in FIG. 4 when a speaker module is lifted upward.

As shown in FIGS. 3 and 4, the base plate 110 may further include an opening 112 configured to pass at least one part of the speaker module 120 therethrough, and the first separation preventing rib 113 protruding upward along the circumference of the opening 112. The speaker module 120 may further include the second separation preventing rib 122 configured to inhibit or prevent the speaker module 120 from departing upward from the base plate 110, together with the first separation preventing rib 113.

The top surface 113a of the first separation preventing rib 113 may be inclined downward. Meanwhile, the lower surface 113b of the first separation preventing rib 113 may be not inclined to be in parallel to the first coupling portion 111.

On the contrary to the first separation preventing rib 113, the top surface 122a of the second separation preventing rib 122 may be not inclined, and the lower surface 122b of the second separation preventing rib 122 may be inclined upward.

Through the structure, the speaker module 120 can be coupled with the base plate 110, and after the speaker module 120 is coupled with the base plate 110, the speaker module 120 can be inhibited or prevented from departing upward from the base plate 110.

More specifically, the top surface 113a of the first separation preventing rib 113 may be inclined in the same direction as the lower surface 122b of the second separation preventing rib 122. Accordingly, if a predetermined force or more is applied when the speaker module 120 is coupled with the base plate 100 from top to bottom, the lower surface 122b of the second separation preventing rib 122 may slide on the top surface 113a of the first separation preventing rib 113. That is, the second separation preventing rib 122 may be elastically deformed to pass through the first separation preventing rib 113.

As shown in FIGS. 4, 5, and 6, after the second separation preventing rib 122 is positioned below the first separation preventing rib 113, the top surface 122b of the second separation preventing rib 122 may contact the lower surface 113b of the first separation preventing rib 113 although the speaker module 120 is lifted upward, so that the speaker module 120 can be inhibited or prevented from departing from the base plate 110. Since the lower surface 113b of the first separation preventing rib 113 and the top surface 122b of the second separation preventing rib 122 are not inclined, although a force is applied on the second separation preventing rib 122, the second separation preventing rib 122 cannot pass through the first separation preventing rib 113 as long as the first and second separation preventing ribs 113 and 122 are not damaged.

The speaker module 120 may further include a plurality of shaft holes 123 formed along the circumferential direction of the second coupling portion 121. The base plate 110 may further include a plurality of guide shafts 114 configured to be inserted into or taken out of the shaft holes 123.

As shown in FIGS. 3, 4, and 5, the speaker module 120 may include the plurality of shaft holes 123 arranged at predetermined intervals along the circumferential direction of the second coupling portion 121. Also, the base plate 110 may include the plurality of guide shafts 114 arranged at predetermined intervals along the inner surface of the first coupling portion 111.

The guide shafts 114 may be inserted into the shaft holes 123, and after the guide shafts 114 are inserted into the shaft holes 123, the guide shafts 114 may be taken out of the shaft holes 123.

As shown in FIG. 5, each guide shaft 114 may include protrusions at both sides, and the upper surface 114a and lower surface 114b of each protrusion may be inclined. Through the inclined surfaces 114a and 114b, the protrusions formed at both sides of the guide shaft 114 may be elastically deformed to move towards each other when the guide shaft 114 passes through the shaft hole 123, so that the guide shaft 114 can pass through the shaft hole 123. Accordingly, the guide shaft 114 can be inserted into or taken out of the shaft hole 123.

Meanwhile, the height of the first separation preventing rib 113 may be higher than that of the guide shaft 114.

As shown in FIG. 6, if a force is applied upward to the speaker module 120 to lift the base plate 110 upward, the guide shaft 114 may pass through the shaft hole 123. If the guide shaft 114 is taken out of the shaft hole 123, the speaker module 120 may lose an anti-rotation binding force in the circumferential direction with respect to the base plate 110. That is, the speaker module 120 can rotate in the circumferential direction. In this case, the first separation preventing rib 113 may contact the second separation preventing rib 122 to inhibit or prevent the speaker module 120 from departing upward from the base plate 110.

Through the above-described structure, the speaker 100 in one form of the present disclosure may change the location of the connector 130 without completely separating the speaker module 120 from the base plate 110. If the speaker module 120 is completely separated from the base plate 110 in order to change the location of the connector 130, it may be difficult to again assemble the speaker module 120 with the base plate 110. Furthermore, if the speaker module 120 is completely separated from the base plate 110, the speaker module 120 may fall onto the ground or the like to be damaged.

Figure 7:
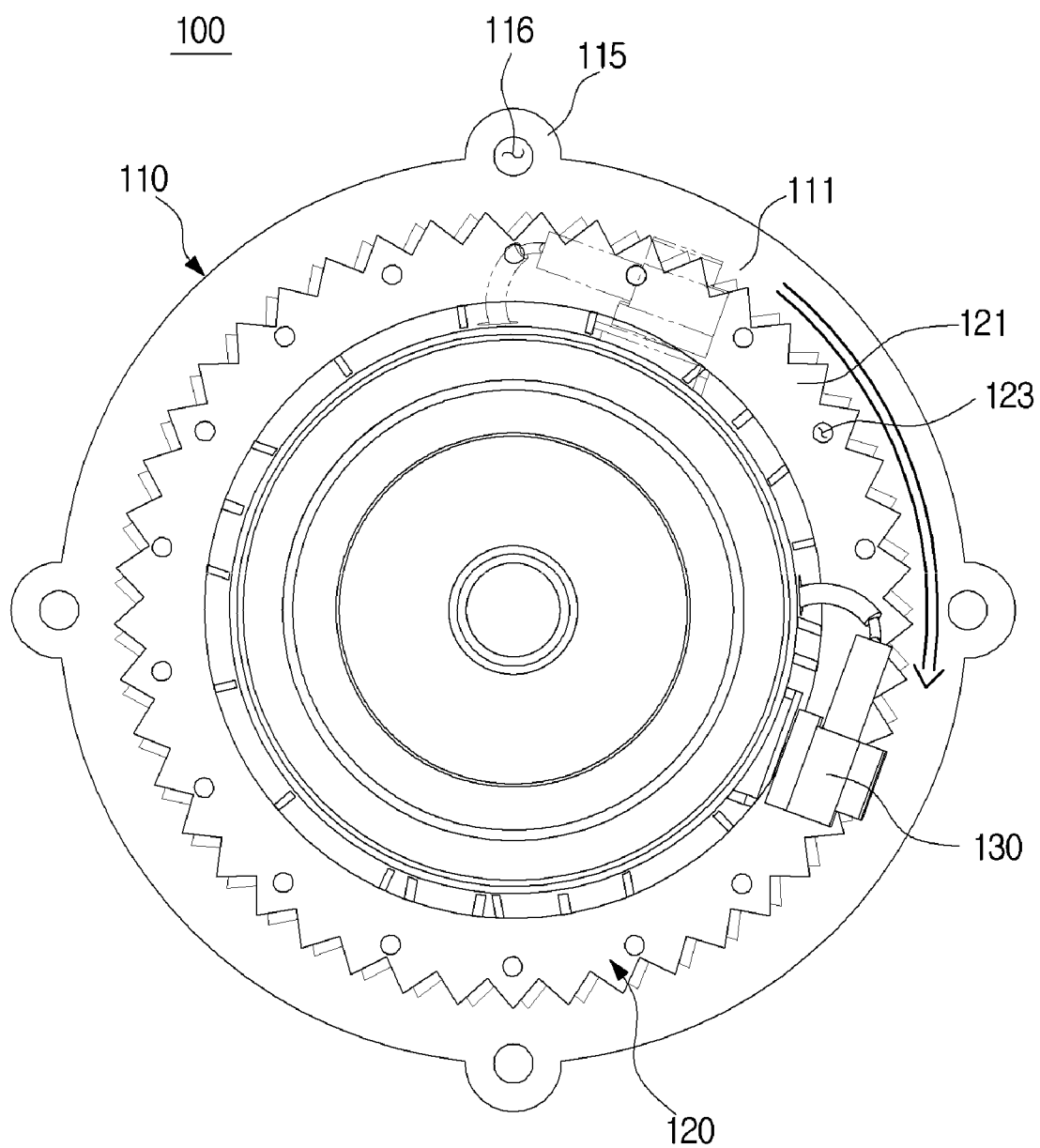
FIGS. 7 and 8 show a speaker for a vehicle when the location of a connector changes.
Figure 8:
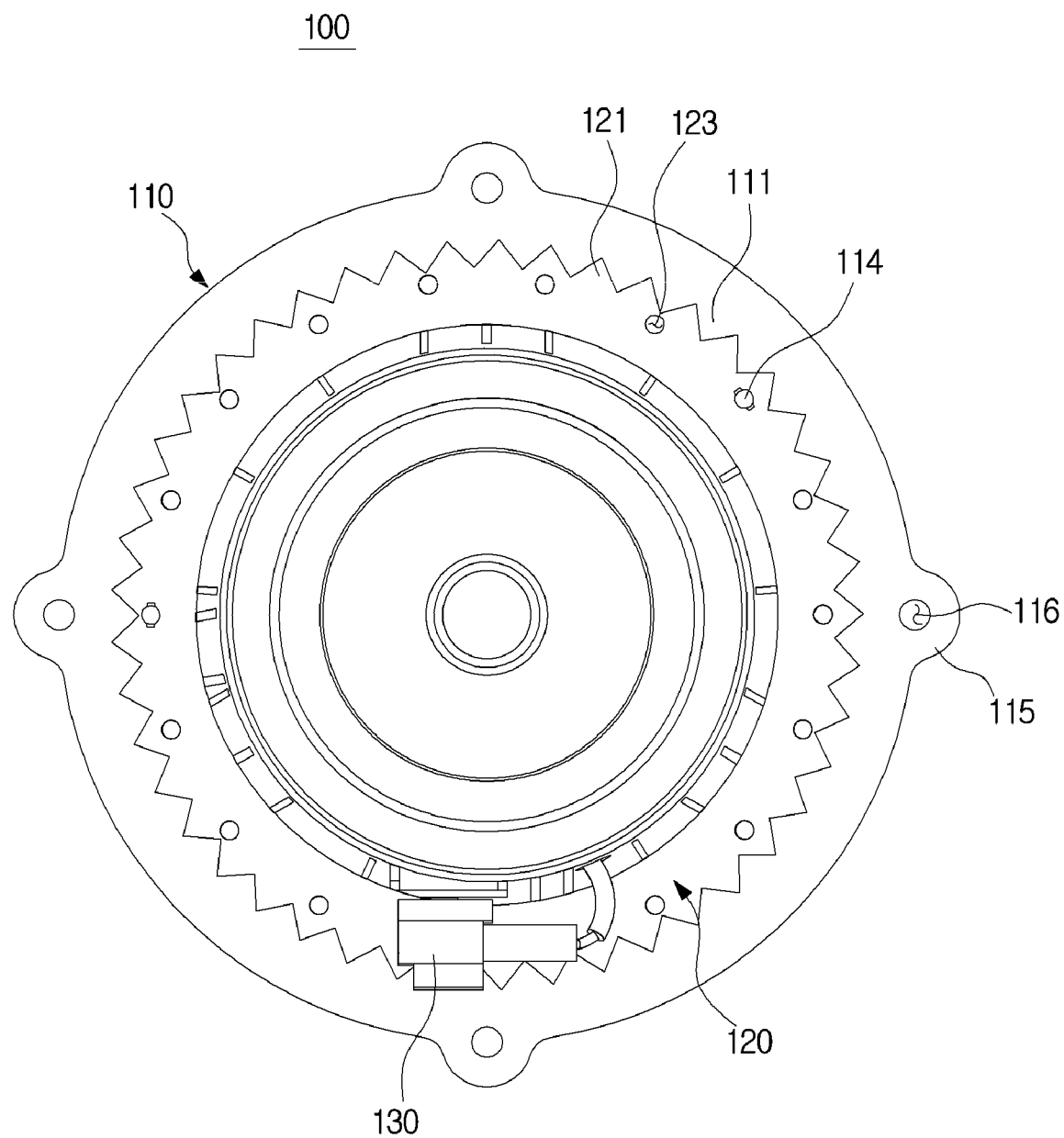

FIGS. 7 and 8 show a speaker for vehicle in one form of the present disclosure when the location of a connector changes.

As shown in FIGS. 7 and 8, the speaker module 120 may be lifted upward from the base plate 110, and then rotated in clockwise/counterclockwise directions. Also, after the speaker module 120 is rotated, the speaker module 120 may be again coupled with the base plate 110. Thereby, the location of the connector 130 can be changed without changing the location of the base plate 110, as described above. By changing the location of the connector 130, it is possible to reduce or prevent the connector 130 from interfering with the door trim 20, and to reduce or prevent water from getting into the connector 130, as described above.

Figure 9:
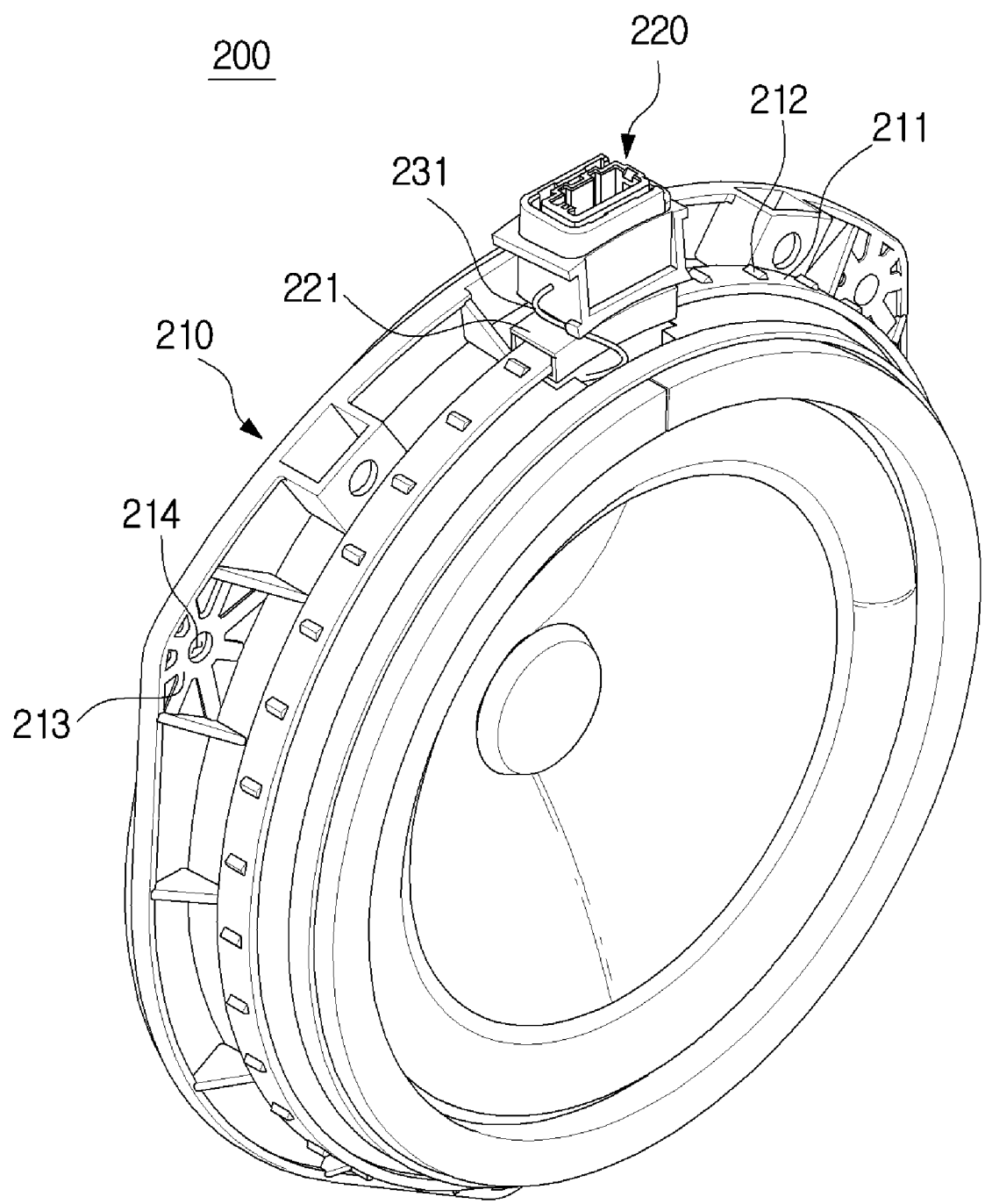
FIG. 9 shows a speaker for a vehicle.
Figure 10:
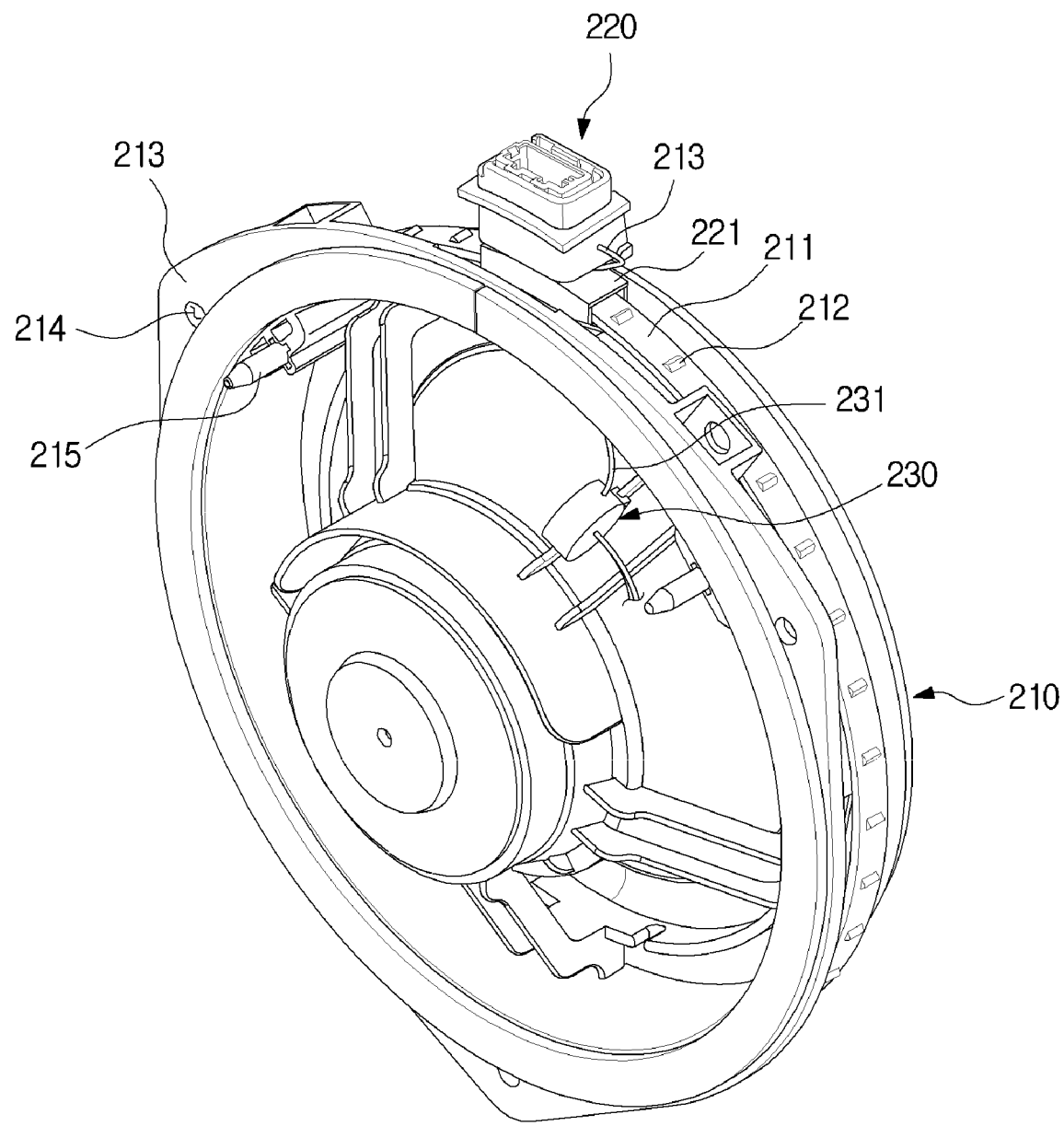
FIG. 10 shows the speaker for the vehicle shown in FIG. 9 at another angle.

FIG. 9 shows a speaker for a vehicle in another form of the present disclosure. FIG. 10 shows the speaker shown in FIG. 9 at another angle.

Hereinafter, a speaker 200 for a vehicle in the form of the present disclosure will be described in detail with reference to the drawings.

The speaker 200 may be installed in a door of a vehicle, and may include a speaker module 210 including a track 211 formed in the shape of a ring on the outer surface of the speaker module 200, a connector 220 connected to the speaker module 210 through a wire 231, and a wire winding device 230 fixed at a portion of the speaker module 210 and configured to adjust the length of the wire 231 according to the location of the connector 220.

In this form, the speaker module 210 may be installed in the door panel 10. The connector 220 may be moved in the circumferential direction of the speaker module 210, without changing the location of the speaker module 210.

The speaker module 210 may include the track 211. The track 211 may be formed in the shape of a ring on the outer surface of the speaker module 210, and used as a movement path of the connector 220.

The speaker module 210 may include a plurality of mounting portions 213 arranged at predetermined intervals along the outer circumference. Each mounting portion 213 may include a mounting hole 214, and may be installed in the mounting hole 11 (see FIG. 1) of the door panel 10 (see FIG. 1) through a coupling member (not shown). If the mounting portion 213 is installed in the door panel 10, the speaker module 210 can be installed in the door panel 10.

The speaker module 210 may include a guide pin 215 protruding downward. The guide pin 215 may enable the speaker module 210 to be semi-assembled with the door panel 10 when the speaker module 210 is installed in the door panel 10. That is, the guide pin 215 may assist the speaker module 210 to be assembled with the door panel 10.

The connector 220 may include a track coupling portion 221. The track coupling portion 221 may surround the track 211. The track coupling portion 221 may move along the track 211. By providing the track coupling portion 221, the connector 220 can move freely on the track 211.

Figure 11:
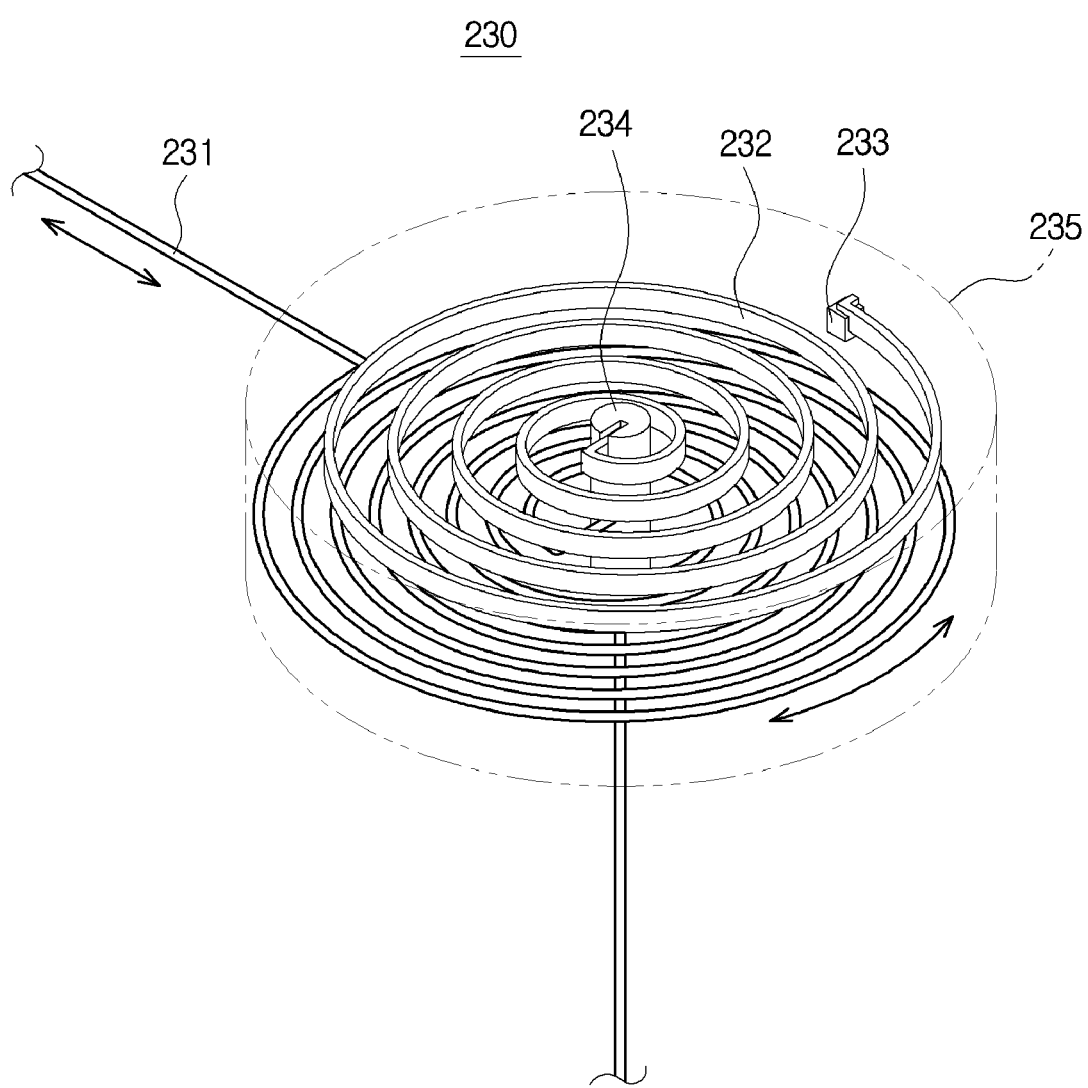
FIG. 11 shows the inside of a wire winding device in the speaker for the vehicle shown in FIG. 10.

FIG. 11 shows the inside of a wire winding device in the speaker shown in FIG. 10.

The speaker 200 may include the wire winding device 230 configured to adjust the length of the wire 231.

The wire winding device 230 may have various structures. FIG. 11 shows one form of the wire winding device 230. For convenience of description, one form of the wire winding device 230 will be described with reference to FIG. 11.

As shown in FIG. 11, the wire winding device 230 may be configured such that the wire 231 is wound inside of the winding device. In the inside of the wire winding device 230, an elastic member 232, a first fixing portion 233 fixing one end of the elastic member 232, and a second fixing portion 234 fixing the other end of the elastic member 232 may be provided. The elastic member 232 may be a leaf spring. Also, one end of the wire 231 may be fixed at the second fixing portion 234.

Through the structure, the wire 231 may be wound in the inside of the wire winding device 230, and if it is pulled out, the wire 231 may be taken out of the wire winding device 230. At this time, the elastic member 232 may accumulate an elastic force. If an external force pulling the wire 231 disappears or is weaken by the elastic force, the wire 231 may again enter the inside of the wire winding device 230.

Figure 12:
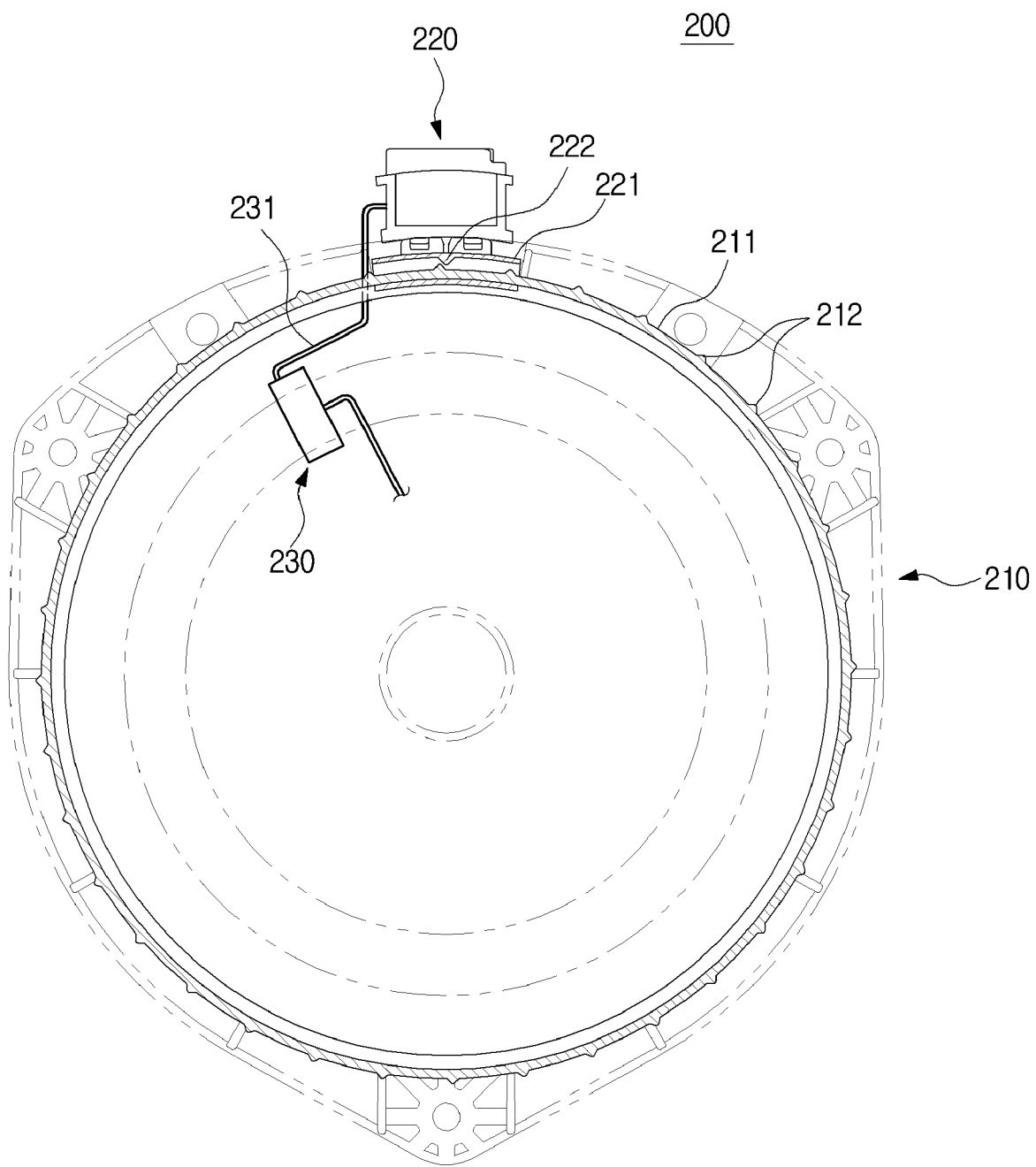
FIGS. 12 and 13 show the speaker for the vehicle shown in FIG. 9 when the location of a connector changes.
Figure 13:
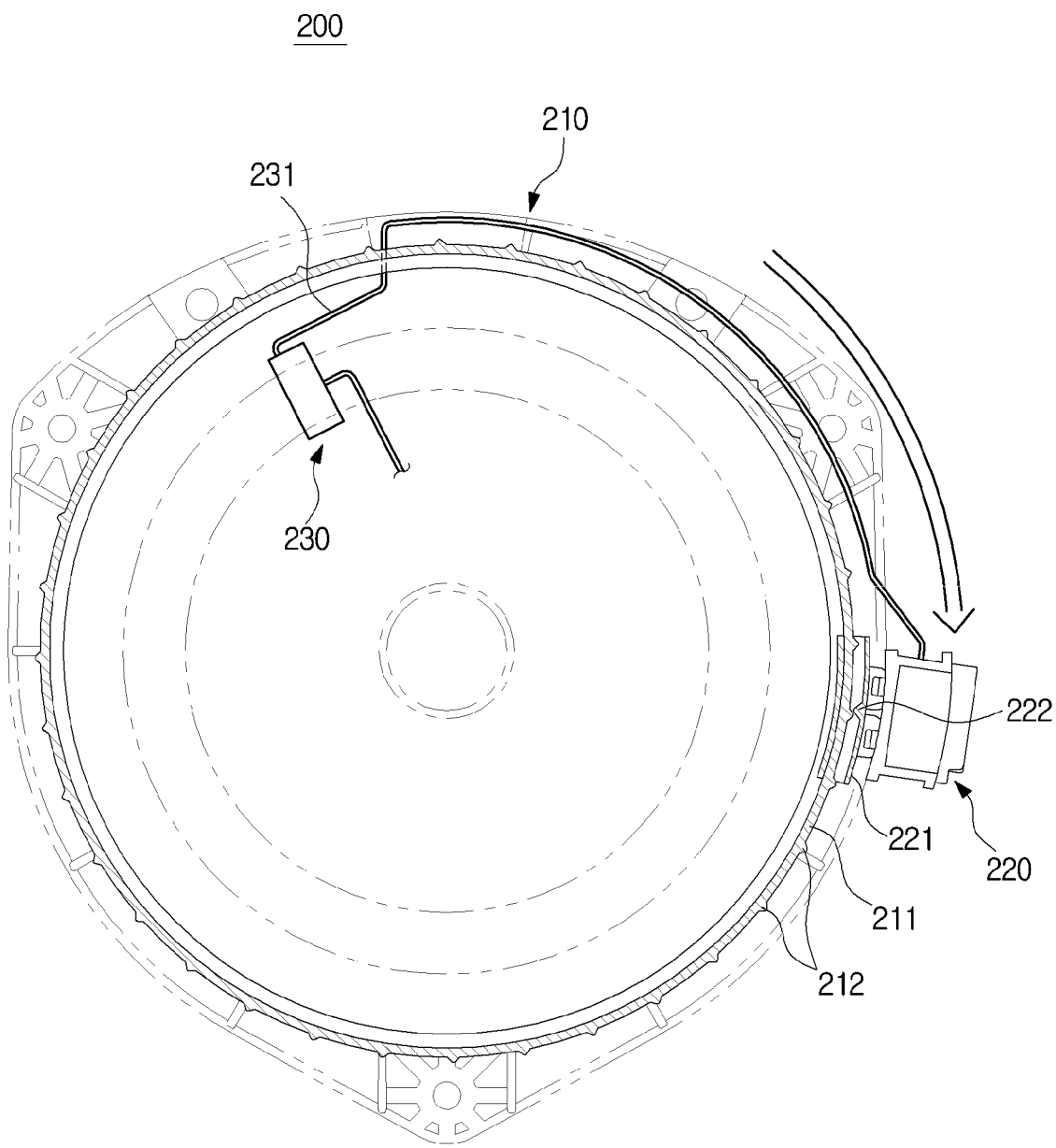
Figure 14:
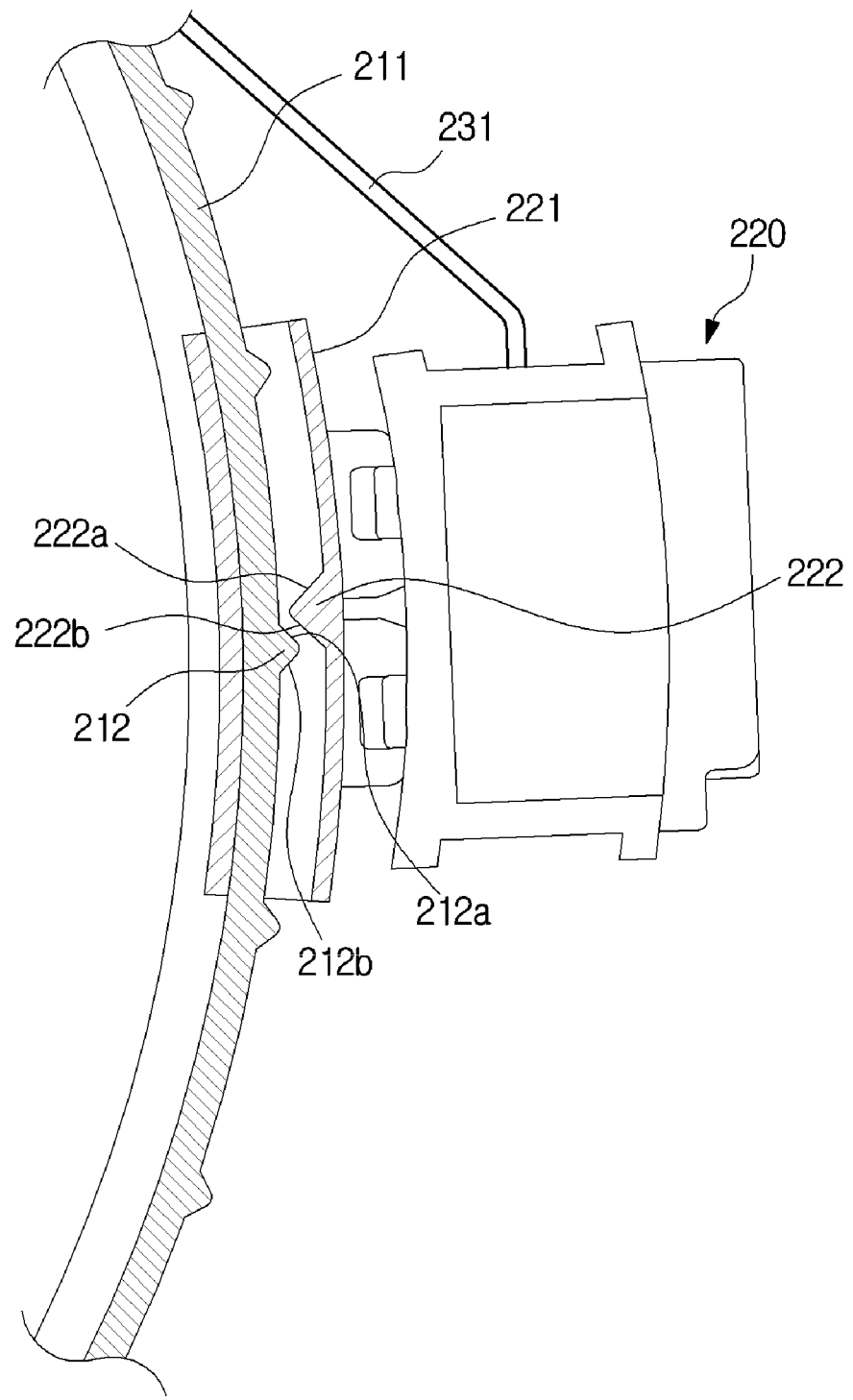
FIG. 14 is an enlarged view of a part of the speaker for the vehicle shown in FIG. 13.
Figure 15:
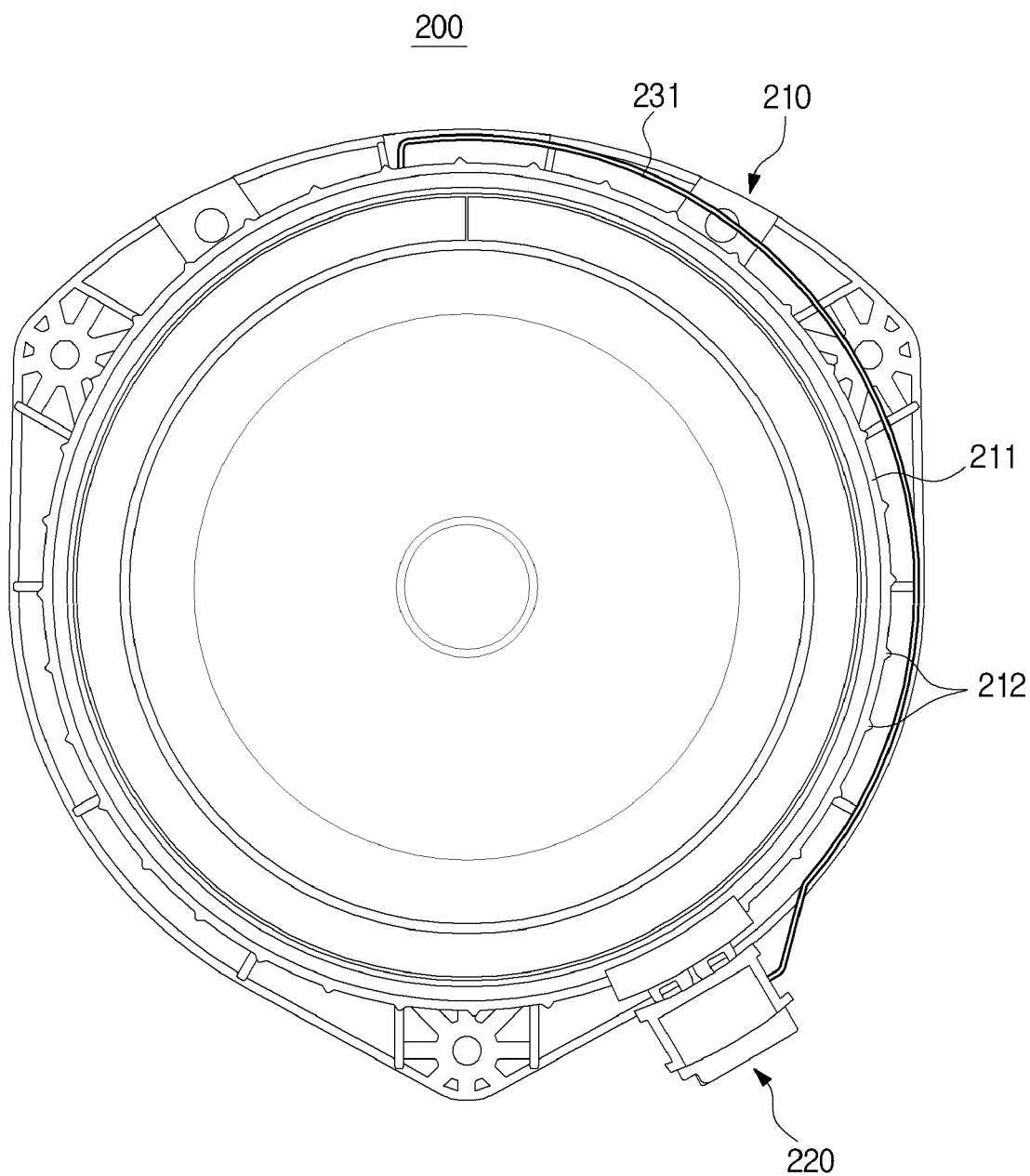
FIG. 15 shows the speaker for the vehicle shown in FIG. 9 after the location of the connector changes.

FIGS. 12 and 13 show the speaker shown in FIG. 9 when the location of a connector changes, and FIG. 14 is an enlarged view of a part of the speaker shown in FIG. 13. Also, FIG. 15 shows the speaker shown in FIG. 9 after the location of the connector changes.

Hereinafter, operation of changing the location of the connector 220 in the speaker 200 in other form of the present disclosure will be described in detail with reference to FIGS. 12 to 15.

The connector 220 may be located on a portion of the track 211. The connector 220 may move freely on the track 211 through the track coupling portion 221, as described above. Accordingly, as shown in FIGS. 12 and 13, the connector 220 may move in a clockwise direction. However, the movement direction of the connector 220 is not limited, and the connector 220 may move in a counterclockwise direction.

As the connector 220 moves along the track 211, the connector 220 may become distant from the wire winding device 230. In this case, the wire 231 wound in the inside of the wire winding device 230 may be taken out of the wire winding device 230.

In contrast, as the connector 220 moves along the track 211, the connector 220 may become close to the wire winding device 230. In this case, the wire 231 may enter the inside of the wire winding device 230.

That is, the wire winding device 230 may adjust the length of the wire 231 according to the location of the connector 220.

Meanwhile, due to the elastic force of the elastic member 232 disposed in the inside of the wire winding device 230, the connector 220 may fail to be fixed at a portion of the track 211. That is, because of the elastic force of the elastic member 232, the connector 220 may move toward the wire winding device 230. Accordingly, the connector 220 may be not fixed at a user's desired location. In order to avoid the problem, the connector 220 and the track 211 may include a connector protrusion 222 and a track protrusion 212, respectively.

The track 211 may include a plurality of track protrusions 212 protruding outward and arranged at predetermined intervals along the circumferential direction of the track 211.

The connector 220 may include the connector protrusion 222 that is caught by one of the track protrusions 212 to fix the connector 220 at a portion of the track 211.

As shown in FIG. 14, both lateral surfaces 222a and 222b of the connector protrusion 222 may be inclined. Likewise, both lateral surfaces 212a and 212b of the track protrusion 212 may also be inclined. Through the structure, when a predetermined force or more is applied to the connector 220, the connector protrusion 222 may be released from the track protrusion 212. That is, if a predetermined force or more is applied to the connector 220, the connector protrusion 222 may be released from the track protrusion 212. The elastic force of the elastic member 232 disposed in the inside of the wire winding device 230 may be smaller than the predetermined force for releasing the connector protrusion 222 from the track protrusion 212. Accordingly, the connector 220 may be fixed on the track 211 by the connector protrusion 222 and the track protrusion 212. Also, a user may apply a predetermined force to the connector 220 to move the connector 220 on the track 211.

As described above, the speaker 200 can change the location of the connector 220 without changing the location of the speaker module 210 installed in the door panel 10. Thereby, it is possible to reduce or prevent the connector 220 from interfering with the door trim 20 (see FIG. 20), and to prevent water from getting into the connector 220.

According to the technical idea of the present disclosure, the speaker for a vehicle capable of changing the location of the connector without changing the location of the mounting hole formed in the door panel of the vehicle or the location of the guide pin of the speaker may be provided.

The technical idea of the present disclosure provides the speaker for a vehicle capable of reducing or preventing the connector from interfering with the door trim of the vehicle.

In addition, the speaker is capable of inhibiting or preventing water entered between the door panel and the door trim of the vehicle from getting into the connector.

According to the technical idea of the present disclosure, the speaker for vehicle that can be used in common in the door panels of various vehicles may be provided.

Although a few forms of the present disclosure have been shown and described, it would be appreciated by those skilled in the art that changes may be made in these forms without departing from the principles and spirit of the disclosure.

What is claimed is:

1. A speaker for a vehicle comprising:
    a base plate configured to be installed in a door of the vehicle, and including a first coupling portion with a predetermined pattern formed along a circumferential direction of an inner surface of the first coupling portion; and
    a speaker module including:
        a connector, and
        a second coupling portion with a predetermined pattern formed on an outer circumferential surface of the second coupling portion along a circumferential direction of the second coupling portion,
    wherein the first coupling portion and the second coupling portion are interlocked with each other so as to bind to each other in the circumferential directions while allowing an up and down movement of the second coupling portion in an axial direction of the speaker module.

2. The speaker according to claim 1, wherein the connector is fixed at an upper portion of the second coupling portion.

3. The speaker according to claim 1, wherein the predetermined patterns formed in the first coupling portion and the second coupling portion include a saw tooth pattern.

4. The speaker according to claim 1, wherein when the second coupling portion is interlocked with the first coupling portion, the second coupling portion is inhibited or prevented from moving in the circumferential direction of the first coupling portion.

5. The speaker according to claim 1, wherein when the second coupling portion is interlocked with the first coupling portion and then lifted upward, the second coupling portion is separated from the first coupling portion.

6. The speaker according to claim 1, wherein when the second coupling portion is lifted from the first coupling portion in the axial direction, the first coupling portion or the second coupling portion is rotated by an arbitrary angle in the circumferential directions.

7. The speaker according to claim 1, wherein the base plate further comprises:
    an opening configured to pass at least one portion of the speaker module therethrough; and
    a first separation preventing rib protruding upward along a circumference of the opening, and having an upper surface that is inclined.

8. The speaker according to claim 1, wherein the speaker module further comprises a second separation preventing rib having a lower surface that is inclined, and
    wherein when the speaker module moves upward to a predetermined height from the base plate, the second separation preventing rib is configured to contact the first separation preventing rib so as to inhibit the speaker module from departing from the base plate.

9. The speaker according to claim 1, wherein the speaker module further comprises a plurality of shaft holes arranged at predetermined intervals along the circumferential direction of the second coupling portion.

10. The speaker according to claim 9, wherein the base plate further comprises a guide shaft configured to be inserted into the corresponding shaft holes.

11. The speaker according to claim 1, wherein the base plate further comprises a mounting portion configured to install the base plate in the door of the vehicle.

12. A speaker for a vehicle comprising:
    a speaker module configured to be installed in a door of the vehicle, and including a track formed in a shape of a ring on an outer surface of the speaker module;
    a connector coupled with the speaker module to be movable in a circumferential direction of the speaker module along the track, and connected to the speaker module through a wire; and
    a wire winding device fixed at a part of the speaker module, and configured to adjust a length of the wire based on a location of the connector.

13. The speaker according to claim 12, wherein when the connector becomes distant from the wire winding device, the wire is taken out of the wire winding device, and
    when the connector becomes close to the wire winding device, the wire enters an inside of the wire winding device.

14. The speaker according to claim 12, where the speaker module further comprises a plurality of track protrusions protruding outward from the track and arranged at predetermined intervals along a circumferential direction of the track.

15. The speaker according to claim 14, wherein the connector further comprises a connector protrusion that is caught by at least one track protrusion of the plurality of track protrusions and configured to fix the connector at a portion of the track.

16. The speaker according to claim 15, wherein both lateral surfaces of each track protrusion of the plurality of track protrusions and the connector protrusion are inclined so that the connector protrusion is released from the corresponding track protrusion when a predetermined force or more is applied to the connector.

17. The speaker according to claim 12, wherein the speaker module comprises a mounting portion configured to install the speaker module in the door of the vehicle.

* * * * *